(12) United States Patent
Power

(10) Patent No.: US 8,052,052 B1
(45) Date of Patent: Nov. 8, 2011

(54) USER-ACTIVATED PAYMENT CARD

(75) Inventor: Michael J. Power, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 399 days.

(21) Appl. No.: 12/328,041

(22) Filed: Dec. 4, 2008

(51) Int. Cl.
*G06K 5/00* (2006.01)

(52) U.S. Cl. .......................... 235/380; 235/379; 235/492

(58) Field of Classification Search .................. 235/380, 235/492, 379
See application file for complete search history.

(56) References Cited

U.S. PATENT DOCUMENTS

| | | | | |
|---|---|---|---|---|
| 5,293,424 A | * | 3/1994 | Holtey et al. | 713/193 |
| 5,971,282 A | * | 10/1999 | Rollender et al. | 235/492 |
| 6,325,285 B1 | * | 12/2001 | Baratelli | 235/380 |
| 2006/0097059 A1 | * | 5/2006 | Miyazaki | 235/492 |
| 2006/0289657 A1 | * | 12/2006 | Rosenberg | 235/492 |
| 2007/0255662 A1 | * | 11/2007 | Tumminaro | 705/79 |
| 2008/0283617 A1 | * | 11/2008 | Lu et al. | 235/492 |

* cited by examiner

*Primary Examiner* — Ahshik Kim
(74) *Attorney, Agent, or Firm* — Park, Vaughan, Fleming & Dowler LLP; Steven E. Stupp

(57) ABSTRACT

Embodiments of a payment card (such as a credit card), a financial-transaction system that uses the payment card, and a method are described. These embodiments may be used to protect financial information stored on the payment card, while providing ease of use to a user of the payment card when conducting a financial transaction. In particular, the payment card may include a transducer that detects a physical phenomenon. If this physical phenomenon is detected, a wireless communication circuit in or on the payment card is enabled, so that the wireless communication circuit can provide the user's financial information in response to an external signal received from an external reading device (such as an radio-frequency identification signal from a card reader).

18 Claims, 3 Drawing Sheets

USER-ACTIVATED PAYMENT CARD

BACKGROUND

The present invention relates to a payment card that is activated by a user.

Fraudulent financial transactions involving stolen personal financial information are becoming increasingly common. This personal financial information is often stolen because of insufficient security associated with payment cards (such as credit cards) that are used to conduct these financial transactions. For example, if a credit card is lost or stolen, it can be used to conduct fraudulent financial transactions until a provider of the credit card is notified and no longer authorizes financial transactions conducted using the credit card.

These security problems can be significantly increased for payment cards that communicate personal financial information via wireless communication. For example, some credit cards use radio-frequency identification (RFID) to communicate personal financial information in response to an external signal generated by a card reader at a point-of-sale terminal (such as a cash register) at a business. These credit cards allow customers to conduct financial transactions with a minimal amount of effort. In particular, instead of communicating personal financial information by swiping a magnetic strip on a credit card through the card reader, the personal financial information can be communicated by placing the credit card in close proximity to the card reader.

Unfortunately, this capability allows thieves to steal customers' personal financial information without stealing their credit cards, and thus, without the customers' knowledge. For example, a thief, who is proximate to a customer, can generate the external signal and receive the customer's personal financial information while the customer's credit card is still in the customer's wallet.

SUMMARY

One embodiment of the present invention provides a payment card that includes a transducer that detects a physical phenomenon. When the physical phenomenon is detected, an enable signal is sent to a wireless communication circuit. This wireless communication circuit provides financial information, which is stored on the payment card, when an external signal is received and when the enable signal is present.

Moreover, the external signal may include a radio-frequency identification signal (such as an RFID signal) from an external reading device (such as a card reader). Additionally, the external signal may provide power to the payment card. However, in other embodiments the payment card includes a power source that is electrically coupled to the transducer, the enable circuit and the wireless communication circuit.

Note that the payment card may include a debit card or a credit card.

Moreover, a wide variety of transducers may be used in the payment card, including: a temperature sensor that detects a temperature change when a user is holding the payment card; a resistive sensor that detects a resistance change when the user is holding the payment card; a capacitive sensor that detects a capacitance change when the user is holding the payment card; a pressure sensor that detects a pressure change when the user is holding the payment card; a photodetector sensor that detects a light-intensity change when the user removes the payment card from a storage location (such as the user's wallet); and/or an acceleration sensor that detects an acceleration change when the user removes the payment card from the storage location.

In some embodiments, the transducer includes a detection circuit that detects a presence or an absence of a gating signal, which is provided by an external source. This external source may include a companion card that is stored in proximity to the payment card between uses of the payment card. Moreover, the enable signal may be disabled when the gating signal is present.

Another embodiment provides a payment system that includes the external reading device and the payment card.

Another embodiment provides a method for communicating financial information using a payment card. During operation, the payment card detects a physical phenomenon through the transducer on the payment card. Next, the payment card provides the enable signal based on the detected physical phenomenon. Then, the payment card receives the external signal. Furthermore, the payment card provides financial information, which is stored on the payment card, via wireless communication when the external signal is received and when the enable signal is present.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a payment card (such as a credit card), a financial-transaction system that uses the payment card, and a method are described. These embodiments may be used to protect financial information stored on the payment card, while providing ease of use to a user of the payment card when conducting a financial transaction. In particular, the payment card may include a transducer that detects a physical phenomenon. If this physical phenomenon is detected, a wireless communication circuit in or on the payment card may be enabled, so that the wireless communication circuit can provide the user's financial information in response to an external signal received from an external reading device (such as an a radio-frequency identification signal from a card reader).

By only providing the user's financial information in response to the external signal when the physical phenomenon is detected, the payment card increases the security of the user's financial information. In particular, the physical phenomenon that is monitored may occur when the user is holding the payment card or when the user removes the payment card from a storage location (such as the user's wallet).

Consequently, it will be significantly more difficult for a thief to remotely access the user's financial information when the payment card is in the storage location. This financial-transaction technique can help promote commerce by increasing user trust, and therefore, use of the payment card.

Figure 1:
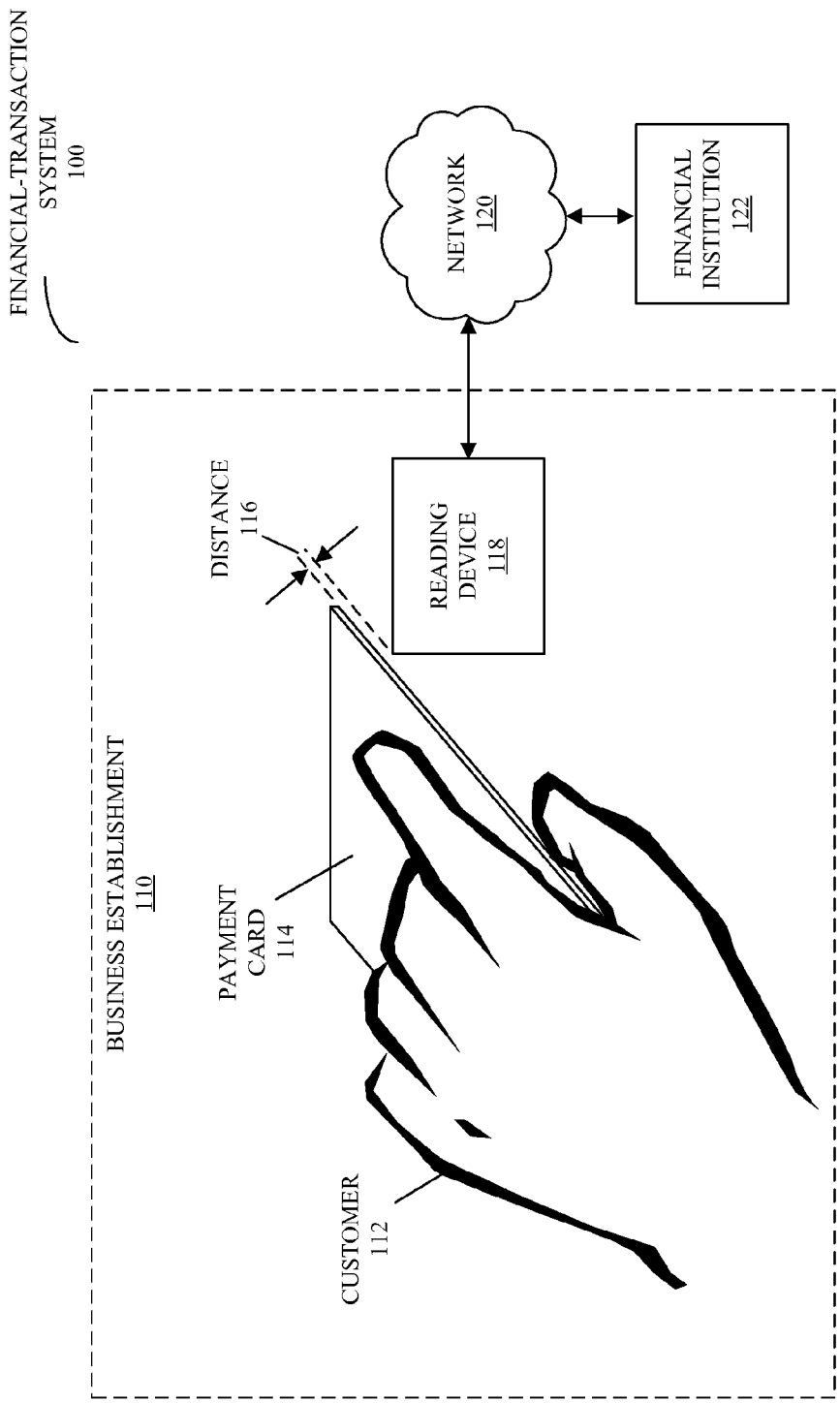
FIG. 1 is a drawing illustrating a financial-transaction system in accordance with an embodiment of the present invention.

In the discussion that follows, credit cards are used as an illustrative example of the payment card. However, the financial-transaction technique may be used with a wide variety of payment cards, including: automatic-teller-machine cards, smart cards and debit cards We now describe embodiments of a financial-transaction system. FIG. 1 presents a drawing illustrating a financial-transaction system 100. In this financial-transaction system, a customer 112 conducts a financial transaction with a merchant at a business establishment 110. In particular, customer 112 purchases a service or a product using a payment card 114 (such as a credit card) by positioning the payment card 114 in close proximity with a reading device 118. For example, during the financial transaction, the payment card 114 may be within a distance 116 of the reading device 118.

As described below with reference to FIG. 2, payment card 114 may include a transducer that monitors one or more physical phenomena. Changes in physical parameters associated with the one or more physical phenomena, such as the changes that occur when customer 112 removes the payment card 114 from a storage location and/or when customer 112 is holding the payment card 114, may be used to gate a wireless communication circuit that is in or on the payment card 114. Moreover, when an external signal is received from the reading device 118, this wireless communication circuit may communicate financial information of customer 112 (such as the customer's name and account number), which is stored on the payment card 114, to the reading device 118. For example, reading device 118 may provide an RFID signal to the payment card 114, which, in conjunction with the change in the one or more physical parameters, may enable communication of the customer's financial information by the payment card 114.

After reading device 118 receives the financial information, the merchant forwards this financial information, as well as other information associated with the financial transaction (such as merchant information, an identifier of reading device 118, a price, and the service or product being purchased) to a financial institution 122 via network 120 for subsequent processing. For example, network 120 may be a credit-card network and financial institution 122 may be a provider of the customer's credit card (such as a bank). Financial institution 122 determines whether to approve or decline the financial transaction, and the resulting decision is communicated back to the merchant.

We now describe embodiments of the payment card. FIG. 2 presents a block diagram illustrating a payment card 210. This payment card includes a transducer 212 that monitors the one or more physical phenomena. An output from transducer 212 is coupled to enable circuit 214. If a change in one or more parameters associated with the one or more physical phenomena are detected, enable circuit 214 may provide an enable signal to wireless-communication circuit 216.

Then, if the external signal (such as an RFID signal) is received from reading device 118 (FIG. 1), wireless-communication circuit 216 may access financial information that is stored in memory 218. This financial information may be communicated by wireless-communication circuit 216 to the reading device 118 (FIG. 1).

In this way, payment card 210 is only active (and able to communicate the financial information) when it is being used by customer 112 (FIG. 1).

In some embodiments, the external signal, at least in part, provides power to payment card 210. However, in other embodiments, payment card 210 includes an optional power source 220 (such as a battery).

Transducer 212 may include a wide variety of transducers, including: a temperature sensor that detects a temperature change associated with the customer 112 (FIG. 1) when customer 112 (FIG. 1) is holding payment card 210; a resistive sensor that detects a resistance change when customer 112 (FIG. 1) is holding the payment card 210 (for example, the customer's hand could complete a circuit by touching one or more conductors on one or more surfaces of payment card 210); a capacitive sensor that detects a capacitance change when customer 112 (FIG. 1) is holding payment card 210 (for example, the capacitance associated with the customer's body could be detected or capacitive-coupling to the customer may complete a circuit); a pressure sensor that detects a pressure change when customer 112 (FIG. 1) is holding payment card 210; a photo-detector sensor that detects a light-intensity change when customer 112 (FIG. 1) removes payment card 210 from a storage location (such as the user's wallet); and/or an acceleration sensor that detects an acceleration change when customer 112 (FIG. 1) removes payment card 210 from the storage location (for example, the enable signal may be provided when one or more components of the acceleration exceed corresponding thresholds).

In some embodiments, transducer 212 includes a detection circuit that detects a presence or an absence of a gating signal, which is provided by an external source. This external source may include a companion card that is stored in proximity to payment card 210 between uses of payment card 210. For example, the gating signal may be received using mutual-inductive coupling between the companion card and the payment card 210. When the gating signal is present, the enable signal may be disabled, and when the gating signal is absent, the enable signal may be provided.

Alternatively, when customer 112 (FIG. 1) is holding the payment card 210 (for example, customer 112 in FIG. 1 may make electrical contact with a contact on a surface of the payment card 210), the customer's body may act as an antenna that allows transducer 212 to receive the external signal. Thus, in some embodiments, the gating signal is the external signal provided by reading device 118 (FIG. 1).

In other embodiments, the companion card may provide a Faraday cage that surrounds at least a portion of payment card 210, and which screens the external signal (i.e., prevents wireless-communication circuit 216 from receiving the external signal). Moreover, in additional embodiments, the gating signal provided by the external source (such as the companion card) jams the external signal. For example, the gating signal may be selected based on the spectral properties of the external signal. In these embodiments, payment card 210 can only interact with reading device 118 (FIG. 1) in the absence of the gating signal (e.g., when the payment card 210 is separated from the companion card).

Figure 2:
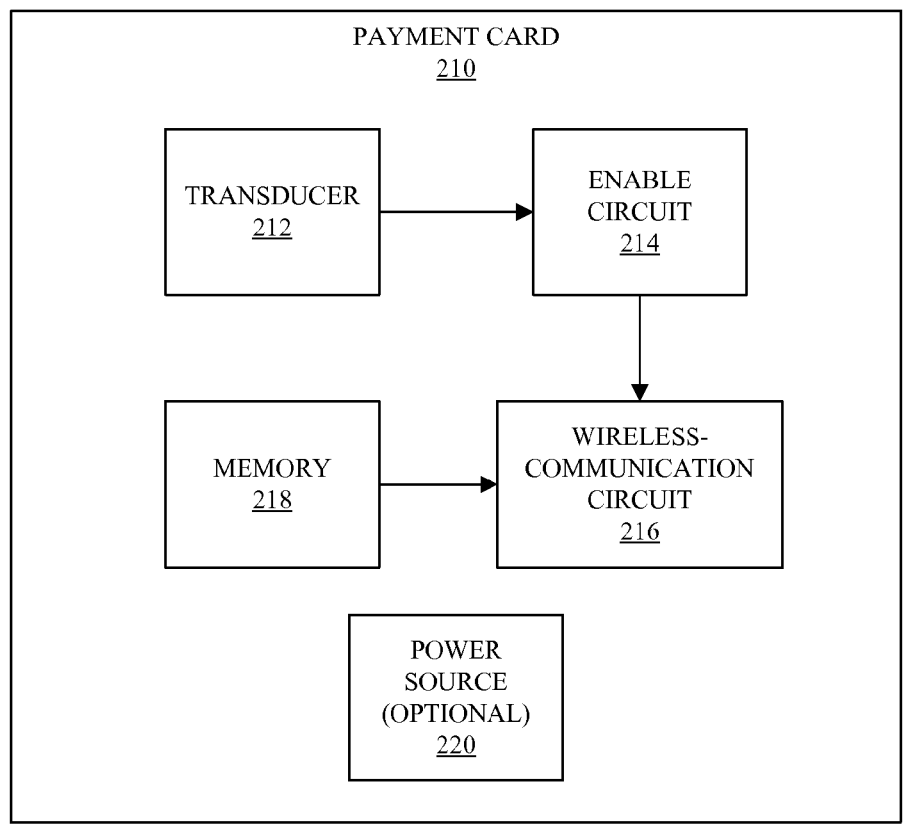
FIG. 2 is a block diagram illustrating a payment card in accordance with an embodiment of the present invention.

Although the payment card 210 is illustrated as having a number of discrete items, FIG. 2 is intended to be a functional description of the various features that may be present in the payment card 210 rather than a structural schematic of the embodiments described herein. In some embodiments, some or all of the functionality of the payment card 210 may be implemented in one or more application-specific integrated circuits (ASICs) and/or one or more digital signal processors (DSPs).

Financial-transaction system 100 (FIG. 1) and/or payment card 210 may include fewer components or additional components. Moreover, two or more components may be combined into a single component, and/or a position of one or more components may be changed. In some embodiments, the functionality of the payment card 210 may be implemented in hardware and/or in software, as is known in the art.

Figure 3:
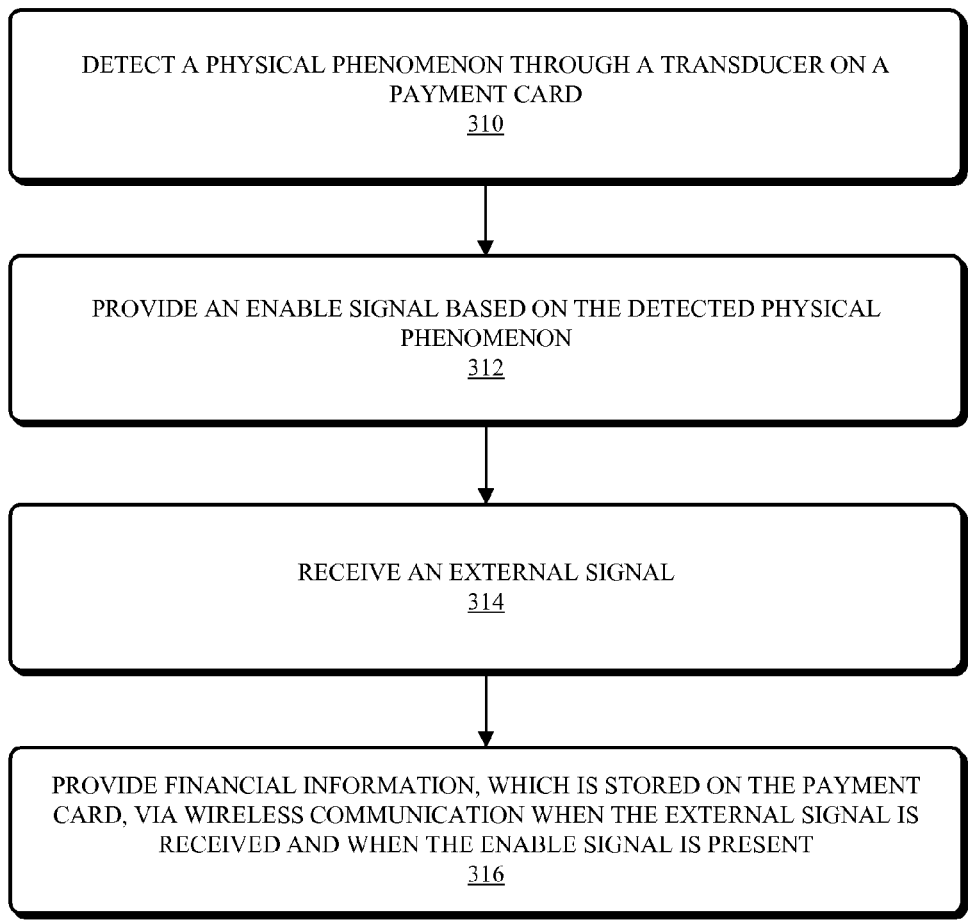
FIG. 3 is a flow chart illustrating a process for communicating financial information using a payment card in accordance with an embodiment of the present invention.

We now describe embodiments of a process for communicating financial information using a payment card. FIG. 3 presents a flow chart illustrating a process 300 for communicating financial information using a payment card. During operation, the payment card detects a physical phenomenon through the transducer on the payment card (310). Next, the payment card provides the enable signal based on the detected physical phenomenon (312). Then, the payment card receives an external signal (314). Furthermore, the payment card provides financial information, which is stored on the payment card, via wireless communication when the external signal is received and when the enable signal is present (316).

In some embodiments of process 300, there may be additional or fewer operations. Moreover, the order of the operations may be changed, and/or two or more operations may be combined into a single operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A payment card, comprising:
a transducer configured to detect a presence or an absence of a gating signal, which is provided by an external source;
an enable circuit, electrically coupled to the transducer, which is configured to provide an enable signal based on the detected gating signal; and
a wireless communication circuit, electrically coupled to the enable circuit, configured to provide financial information, which is stored on the payment card, when an external signal is received and when the enable signal is present.

2. The payment card of claim 1, wherein the external signal includes a radio-frequency identification signal from an external reading device.

3. The payment card of claim 1, wherein the external signal provides power to the payment card.

4. The payment card of claim 1, further comprising a power source which is electrically coupled to the transducer, the enable circuit and the wireless communication circuit.

5. The payment card of claim 1, wherein the payment card includes a debit card or a credit card.

6. The payment card of claim 1, wherein the transducer detects a physical phenomenon, and wherein the enable circuit is further configured to provide the enable signal based on the detected physical phenomenon.

7. The payment card of claim 6, wherein the transducer includes a photo-detector sensor that detects a light-intensity change when a user removes the payment card from a storage location.

8. The payment card of claim 1, wherein the enable signal is disabled when the gating signal is present.

9. The payment card of claim 1, wherein the external source includes a companion card which is stored in proximity to the payment card between uses of the payment card.

10. A method for communicating financial information using a payment card, comprising:
detecting a presence or an absence of a gating signal, which is provided by an external source through a transducer on the payment card;
providing an enable signal based on the detected gating signal;
receiving an external signal; and
providing financial information, which is stored on the payment card, via wireless communication when the external signal is received and when the enable signal is present.

11. The method of claim 10, wherein the external signal includes a radio-frequency identification signal from an external reading device.

12. The method of claim 10, wherein the external signal provides power to the payment card.

13. The method of claim 10, wherein the payment card includes a debit card or a credit card.

14. The method of claim 10, further comprising detecting a physical phenomenon through the transducer, and wherein the enable signal is provided based on detecting the physical phenomenon.

15. The method of claim 14, wherein detecting the physical phenomenon involves detecting a light-intensity change when a user removes the payment card from a storage location.

16. The method of claim 10, wherein the enable signal is disabled when the gating signal is present.

17. The method of claim 10, wherein the external source includes a companion card which is stored in proximity to the payment card between uses of the payment card.

18. A payment card, comprising:
a photo-detector sensor that detects a light-intensity change when a user removes the payment card from a storage location;
an enable circuit, electrically coupled to the photo-detector, which is configured to provide an enable signal based on the detected light-intensity change; and
a wireless communication circuit, electrically coupled to the enable circuit, configured to provide financial information, which is stored on the payment card, when an external signal is received and when the enable signal is present.

* * * * *